INVENTOR.
ALFRED S. SCIPIONE
BY H. L. Mackey
ATTORNEY

INVENTOR.
ALFRED S. SCIPIONE
BY H. S. Mackey
ATTORNEY

United States Patent Office 3,479,459

Patented Nov. 18, 1969

3,479,459

METHOD OF GENERATING A COMPOSITE BLANKING SIGNAL FROM A COMPOSITE SYNC SIGNAL

Alfred S. Scipione, Stamford, Conn., assignor to Singer-General Precision, Inc., a corporation of Delaware Filed Dec. 1, 1966, Ser. No. 598,390
Int. Cl. H04l 7/04
U.S. Cl. 178—69.5 5 Claims

ABSTRACT OF THE DISCLOSURE

A composite sync signal is applied to a delay thereby developing an identical sync signal offset in time from the original sync signal. The delayed sync signal is used to control a television system. The original and delayed signals are combined for producing coincident signals among which is a precisely positive 0.5 microsecond pulse. The 0.5 microsecond pulse is isolated and used to generate a 1200 microsecond vertical blanking pulse. The original sync signal is also used to actuate pulse forming circuitry for generating a precisely positioned 11 microsecond horizontal blanking pulse. The 11 microsecond and the 1200 microsecond pulses are combined to form a blanking signal in proper phase synchronism with the delay sync signal, the two signals conforming to the standard RETMA television control signals.

Brief summary of the invention

The present invention relates to a system for generating related control signals for television systems. In particular the present invention relates to a novel system for generating a composite blanking signal from a composite sync signal used cooperatively for operating a television system.

One advantage of the present invention is that the relationship between the pulses of the composite sync signal and the pulses of the composite blanking signal is maintained irrespective of how the sync signal may vary. In addition the novel system has the advantage of reducing the number of coaxial cables normally necessary for television camera operation.

Essentially a composite sync signal includes a plurality of reoccurring series of pulses at different time intervals. One such series of pulses is normally referred to as horizontal sync pulses and another series is normally referred to as equalizing pulses. Since the difference between types of pulses is the time length of the pulse and the leading edge of all pulses in the sync signal are substantially the same, it is difficult to predetermine the first pulse of any one series of pulses of the sync signal until after completion of the pulse itself.

The composite blanking signal is also a plurality of reoccurring series of pulses, however, the leading edge of each pulse used for horizontal blanking bears a certain time relationship to the leading edge of the associated horizontal sync pulse of the sync signal and the leading edge of the vertical blanking pulse bears a time relation to the first equalizing pulse of the composite sync signal. Timewise, the leading edge of each horizontal blanking pulse occurs prior to the leading edge of the associated horizontal sync pulse for forming the "horizontal front porch." The leading edge of the vertical blanking pulse occurs at least in coincidence with the leading edge of the first equalizing pulse of the sync signal.

The time relationship between the pulses of the sync signal and the pulses of the blanking signal and their respective characteristics have been essentially standardized. This is known in the art as the standard RETMA signals. The standard RETMA pulse forms for the sync and blanking signals are illustrated on page 9 of the bulletin EIA RA–170 published and copyrighted in 1957 by the Electronic Industries Association.

The present invention is a novel approach and system for generating the blanking signal from the sync signal. This novel arrangement maintains the standardized time relationship between the signals and reduces the number of coaxial cables normally used for television camera operation.

Breifly, the present invention provides for accepting a composite sync signal and delaying such signal so that two identical composite sync signals are provided, one offset or delayed in time with respect to the other. These will be referred to as the normal composite sync signal and the delayed composite sync signal and it is to be kept in mind that the two signals are identical, except for the time delay between the signals. The normal composite sync signal is generated and applied to a delay means thus forming the delayed composite sync signal. The normal and the delayed sync signals are sensed, in combination and provide several pulses, including a pulse precisely positioned with respect to the leading edge of the first equalizing pulse of the delayed sync signal. This pulse is isolated and serves to provide the desired length vertical blanking pulse. In order to form the horizontal blanking pulse the normal sync signal is used to activate a pulse forming network, the output of which produces a precisely positioned horizontal blanking pulse which is combined with the vertical blanking pulse for providing the composite blanking signal. The normal sync signal is discarded and the delayed sync signal and the newly formed blanking signal are applied as input signals to operate a television system.

Since the normal composite sync signal and the delayed composite sync signal remain at a fixed predetermined relationship and the composite blanking signal and the normal composite sync signal are also maintained at a fixed predetermined relationship then the blanking signal bears a relation to the delayed sync signal which summarily conforms to the standards of RETMA.

In practice not only are the delayed sync signal and the blanking signal maintained in desired relationship but the normal composite sync signal may be generated external to a television camera while the delayed sync signal and the blanking signal may be produced internally in the television camera thus reducing the number of coaxial leads into the television camera.

It is therefore an object of the present invention to provide a delayed sync signal and a blanking signal from a normal sync signal whereby the relation between the delayed sync signal and the blanking signal meets RETMA standards.

Another object is to provide a system for applying a sync signal and a blanking signal to a television camera which reduces the number of coaxial links to the television camera.

These and other objects will become more apparent from reading the following detailed description with reference to the accompanying drawings in which.

Figure 1:
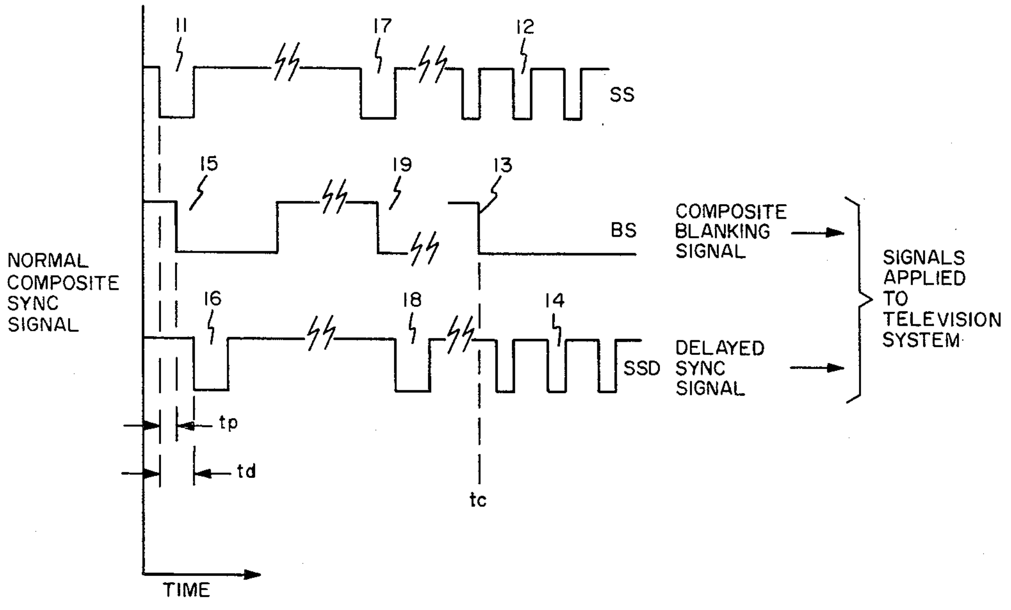
FIG. 1 is a graphic representation of the desired relationship between the normal sync signal, the delayed sync signal and the blanking signal, as accomplished by the present invention.

Referring to FIG. 1 representations of a normal composite sync signal, SS, a delayed composite sync signal, SSD, and a blanking signal, BS are shown. Typical pulses of the normal sync signal are represented as pulses 11, 17 and 12. The pulses 16, 18 and 14 are represented as corresponding pulses in the delayed sync signal, delayed for an interval represented by $t_d$. Pulses 11 and 17 represent horizontal sync pulses of the normal sync signal and pulse 12 represents the first equalizing pulse following the series of horizontal sync pulses. Pulses 16 and 18 represent the corresponding horizontal sync pulses as delayed and pulse 14 represents the corresponding equalizing pulse, as delayed.

The composite blanking signal is represented by pulses 15 and 19, which represent horizontal blanking pulse, and the pulse having a leading edge 13, representing the vertical blanking pulse. It will be noticed that the leading edge of the horizontal blanking pulse 15 occurs prior to occurrence of the leading edge of the horizontal sync pulse 16 by a time interval $t_p$. This time interval is referred to as the horizontal front porch. It will also be noticed that the leading edge 13 of the vertical blanking pulse occurs at a time $t_c$ with respect to the leading edge of the pulse 14 of the delayed sync signal. In actual practice the time relation between the leading edge of the vertical blanking pulse and the leading edge of the first equalizing sync pulse is that these leading edges may occur simultaneously or the leading edge of the blanking pulse may precede the leading edge of the first equalizing pulse within an allowable time tolerance.

The delayed composite sync signal and the composite blanking signal may be applied to a television system for operating such system.

Figure 2:
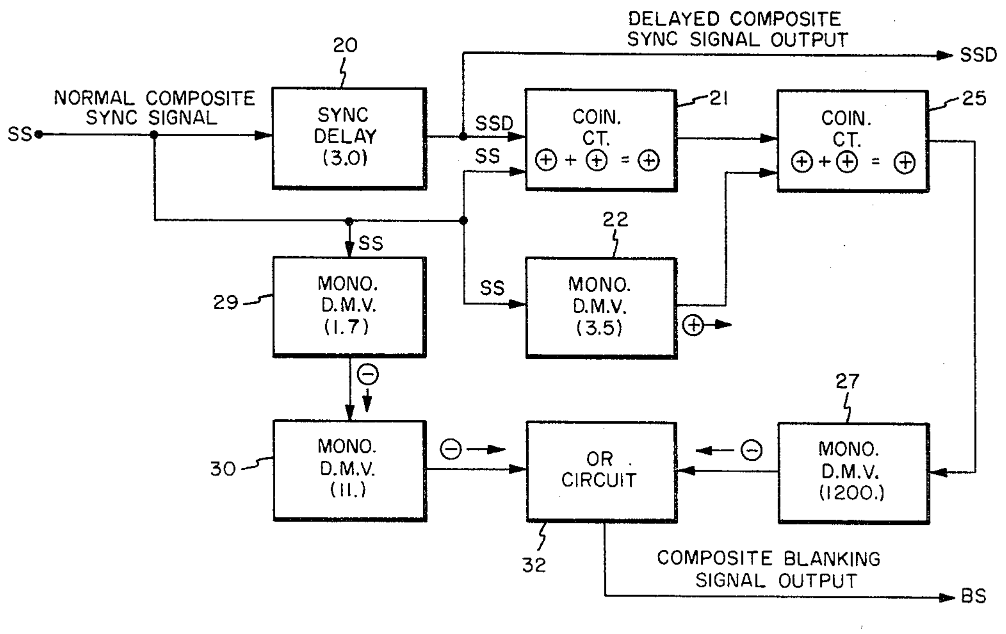
FIG. 2 is a block diagram of the present invention.

Referring to the block diagram of FIG. 2, it will be seen that a normal composite sync signal SS is applied to a sync delay 20 which may provide a delay of the order of 3.0 microseconds. The output of the sync delay may serve as the delayed composite sync signal SSD.

Figure 3:
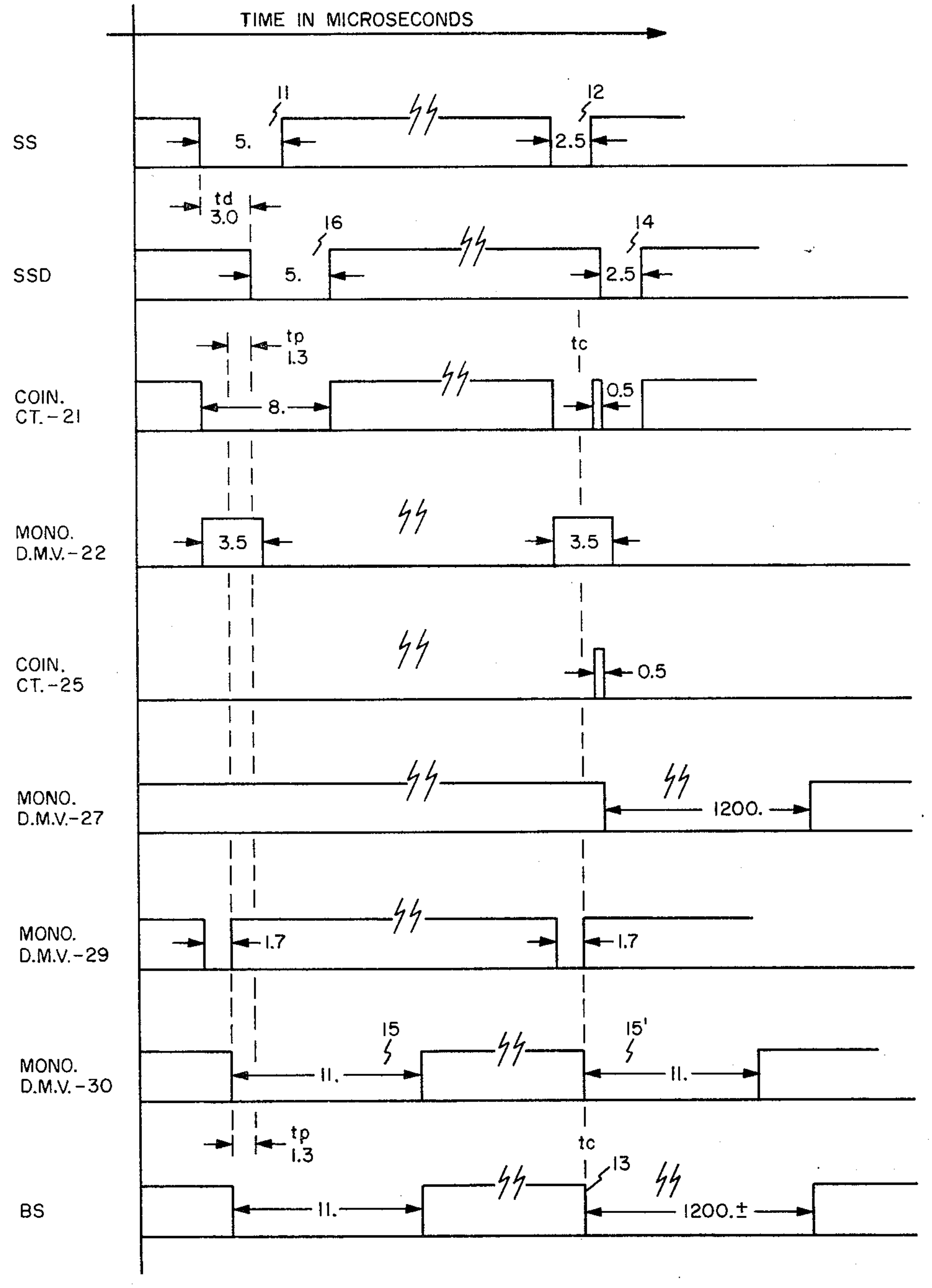
FIG. 3 is a graphic illustration of the wave forms generated by the several components represented in block form in FIG. 2.

Referring to FIG. 3 in conjunction with FIG. 2, the normal composite sync signal is represented as the signal SS. The delayed composite sync signal is represented as the signal SSD which is delayed for the time interval $t_d$, here the time $t_d$ equals 3.0 microseconds.

The signals SS and SSD are applied to a coincidence gate circuit 21 which functions to provide a positive output when both inputs are positive. The output of the coincidence gate 21 is represented to the left of the label COIN. CT.–21. The purpose of the gate 21 is to generate the 8 microsecond negative pulse generated by the out-of-phase occurrence of the 5 microsecond pulses 11 and 16 of the signals SS and SSD respectively. Also generated by the coincidence gate is the 0.5 microsecond positive pulse occurring between the trailing edge of the first equalizing pulse 12 of the signal SS and the leading edge of the delayed first equalizing pulse 14 of the signal SSD. It will be understood that only one horizontal sync pulse and one equalizing pulse of the respective sync signals are represented.

The normal sync signal SS is also applied to a monostable delay multivibrator 22 which provides a positive-going pulse 3.5 microseconds in duration in response to the leading edge each of negative-going pulses of the signal SS. The output of the multivibrator 22 is represented as wave MONO. D.M.V.–22.

The outputs of the coincidence gate 21 and the delay multivibrator 22 are applied to a coincidence gate circuit 25 which functions to provide a positive pulse output in response to both inputs being positive. Thus, the coincidence gate 25 serves to isolate the precisely positioned 0.5 microsecond positive pulse, represented in FIG. 3 to the left of the label COIN. CT.–25.

The output of the coincidence gate 25 is applied to a monostable delay multivibrator 27 which provides a negative pulse of substantially 1200 microseconds in length. This may be seen in FIG. 3 to the right of label MONO. D.M.V.–27. The 1200 microsecond pulse occurs in response to occurrence of the trailing edge (negative-going) of the 0.5 microsecond pulse. This positions the 1200 microsecond pulse so that the leading edge of the 1200 microsecond pulse occurs simultaneously with the leading edge of the first equalizing pulse of the delayed sync signal (represented by pulse 14). Thus the 1200 microsecond pulse may serve as the vertical blanking pulse of the composite blanking signal.

The normal sync signal SS is also applied to a monostable delay multivibrator 29 which provides a 1.7 microsecond negative-going pulse in response to the leading edge (negative-going) of each pulse of the normal sync signal.

The 1.7 microsecond pulse, seen at the right of label MONO. D.M.V.–29, is applied to another monostable delay multivibrator such as 30, which provides a negative-going 11 microsecond pulse, represented as pulse 15 and 15'. The leading edge of the pulse 15 precedes the leading edge of the horizontal sync pulse 16 by substantially 1.3 microseconds (3.0—1.7=1.3). The pulse 15 may then serve as the horizontal blanking pulse which is precisely positioned, with respect to the horizontal sync pulses of the delayed sync signal, for forming the "horizontal front porch" and horizontal blanking pulse.

A 1.7 microsecond pulse also occurs in response to the leading edge of the first equalizing pulse, such as pulse 12. The trailing edge of this 1.7 microsecond pulse activates delay multivibrator 30 which generates another 11 microsecond pulse 15' which occurs at the time $t_c$.

The 11 microsecond pulse and the 1200 microsecond pulse are applied to an OR circuit 32 which provides an output which is a combination of both pulses. The 11 microsecond pulses, generated in response to the horizontal sync pulses of the normal composite sync signal, serve as the horizontal blanking pulses synchronized with the horizontal sync pulses of the delayed composite sync signal and the 11 microsecond pulse, generated in response to the first equalizing pulse of the normal composite sync signal, is combined with the 1200 microsecond pulse which is generated in response to the isolated 0.5 microsecond pulse, for forming the 1200± microsecond vertical blanking pulse particularly associated with the first equalizing pulse of the delayed composite sync signal. The leading edge 13 of the 1200± microsecond vertical blanking pulse occurs at the time $t_c$ and is the leading edge of the 11 microsecond pulse 15'. Thus the vertical blanking pulse occurs just prior to the leading edge of the first equalizing pulse of the delayed composite sync signal and is within the time tolerance.

Obviously the output of the OR circuit 32 is the composite blanking signal which is in phase synchronism with the delayed composite sync signal.

Thus from the normal composite sync signal, SS, a delayed composite sync signal SSD is generated and by using the normal composite sync signal and the delayed composite sync signal a composite blanking signal is generated which is in proper phase synchronism with the delayed composite sync signal.

Thus, the present invention has been shown and described in block form. The individual components which are represented in block form may each be off-the-shelf components and may take any one of several different forms. The sync delay, for example, may be in the form of a delay line or other form of delay circuit, well-known in the art. The monostable delay multivibrators may take any of several well-known forms. In general the individual components may be in any form desired for providing the function represented.

Other arrangements of the present invention may be made, as will be familiar to those skilled in the art, without departing from the spirit of the invention as defined in the appended claims.

What is claimed is:

1. Apparatus for generating a sync signal and a blanking signal, in phase synchronism with the first mentioned sync signal, from an original sync signal including:

means for delaying said original sync signal for generating a delayed sync signal identical to said original sync signal and offset in time, a first coincidence circuit responsive to phase coincidence for providing at least a spike pulse in response to phase coincidence of said original sync signal and said delayed sync signal, a delay multivibrator responsive to a characteristic of said original sync signal for providing a pulse which matches the phase characteristics of said spike pulse and occurs at least simultaneously with said spike pulse, a second coincidence circuit responsive to phase coincidence for isolating said spike pulse in response to the output of said first coincidence circuit and the output of said delay multivibrator, a second delay multivibrator for generating a first blanking pulse the leading edge of which corresponds timewise to the trailing edge of said spike pulse, said first blanking pulse generated in response to the output of said second coincidence circuit, means responsive to said original sync signal for generating a second blanking pulse having the same phase characteristics as said first blanking pulse and at least overlapping the leading edge of said first blanking pulse timewise, and an OR circuit responsive to the output of said second delay multivibrator and said responsive means for providing a blanking signal in phase synchronism with said delayed sync signal.

2. Apparatus as in claim 1 in which said delayed sync signal is delayed substantially 3.0 microseconds with respect to the said original sync signal, and the said spike pulse output of the said first coincidence circuit is provided in response to coincidence between part of the said original synch signal following the trailing edge of the first equalizing pulse of the said original sync signal and part of the said delayed equalizing pulse of the said delayed sync signal.

3. Apparatus for generating a delayed sync signal from an original sync signal and for generating a blanking signal in phase synchronism with said delayed sync signal including:

delay means for providing an output signal identical to the input signal and displaced in time with respect to said input signal, means for applying said original sync signal to said delay means as an input so that said output is said delayed sync signal, first coincidence means for providing at least a spike pulse having first phase characteristics in response to coincidence of said first phase characteristics of said original sync signal and said first phase characteristics of said delayed sync signal, means for providing a pulse of predetermined length having said first phase characteristics in response to said original sync signal changing from said first phase characteristic to a second phase characteristic, second coincidence means for isolating said spike pulse in response to coincidence of said spike pulse and said pulse of predetermined length, means responsive to the termination of said isolated spike pulse for providing a first blanking pulse having said second phase characteristics, means for providing a second blanking pulse of a second predetermined length having said second phase characteristics and at least occurring prior to occurrence of said first blanking pulse, in response to said original sync signal changing from said first phase characteristic to said second phase characteristic, and an OR circuit responsive to said first blanking pulse and said second blanking pulse for providing a blanking signal in phase synchronism with said delayed sync signal.

4. Apparatus as in claim 3 and in which:

the delay of said delay means is substantially 3.0 microseconds, the said first phase characteristic is positive with respect to said second phase characteristic, the length said pulse having a predetermined length is substantially 3.5 microseconds, the length of said spike pulse is substantially 0.5 microseconds, the length of said first blanking pulse is substantially 1200 microseconds, and the length of said second blanking pulse is substantially 11 microseconds.

5. Apparatus as in claim 3 and in which said second blanking pulse is the horizontal blanking pulse of the blanking signal, and said second blanking pulse and said first blanking pulse are combined for forming the vertical blanking pulse.

References Cited

UNITED STATES PATENTS 3,333,060 7/1967 Searle et al. -------- 178—69.5

ROBERT L. GRIFFIN, Primary Examiner

R. L. RICHARDSON, Assistant Examiner

U.S. Cl. X.R.

328—63, 139